United States Patent [19]

Haley

[11] Patent Number: 4,712,453

[45] Date of Patent: Dec. 15, 1987

[54] HYDRAULIC CONTROL SYSTEM FOR CONTINUOUSLY VARIABLE TRANSMISSION

[75] Inventor: William J. Haley, Sterling Heights, Mich.

[73] Assignee: Borg-Warner Corporation, Chicago, Ill.

[21] Appl. No.: 832,208

[22] Filed: Feb. 24, 1986

Related U.S. Application Data

[63] Continuation of Ser. No. 728,533, Apr. 29, 1985, abandoned, which is a continuation of Ser. No. 421,198, Sep. 22, 1982, abandoned.

[51] Int. Cl.[4] .............................................. B60K 41/18
[52] U.S. Cl. ........................................ 74/866; 74/867
[58] Field of Search ................. 74/861, 565, 866, 867, 74/868; 474/18, 28

[56] References Cited

U.S. PATENT DOCUMENTS

| | | | |
|---|---|---|---|
| 2,552,604 | 5/1951 | Thoma | 74/687 |
| 2,700,341 | 1/1955 | Smirl | 418/25 |
| 3,200,666 | 8/1965 | Schrodt et al. | 474/18 X |
| 3,893,344 | 7/1975 | Dantlgraber et al. | 74/867 |
| 3,918,312 | 11/1975 | Espenschied et al. | 474/18 X |
| 4,094,203 | 6/1978 | van Deursen et al. | 474/28 |
| 4,100,794 | 7/1978 | Meixner | 73/862.28 |
| 4,106,367 | 8/1978 | Bouvet | 74/866 |
| 4,241,618 | 12/1980 | Smirl | 74/863 |
| 4,387,608 | 6/1983 | Mohl et al. | 474/18 X |
| 4,400,164 | 8/1983 | Cadee | 474/18 X |
| 4,403,975 | 9/1983 | Rattunde | 474/18 |
| 4,419,910 | 12/1983 | Miki et al. | 74/868 X |
| 4,458,318 | 7/1984 | Smit et al. | 74/866 X |
| 4,459,878 | 7/1984 | Frank | 74/866 X |
| 4,466,521 | 8/1984 | Hattori et al. | 192/0.092 X |
| 4,509,125 | 4/1985 | Fattic et al. | 74/866 X |
| 4,515,255 | 5/1985 | Haley et al. | 192/3.57 |
| 4,522,086 | 6/1985 | Haley | 74/862 X |

Primary Examiner—Leslie Braun
Assistant Examiner—Joseph M. Rolnicki
Attorney, Agent, or Firm—James J. Jennings

[57] ABSTRACT

A control arrangement for a continuously variable transmission includes an electronic control system and a hydraulic control system. In the hydraulic control system solenoid valves are used in conjunction with fluid control valves to regulate the various fluid pressure levels in the system. A variable displacement pump provides fluid under pressure in the main line. A modulator valve, connected to the main line, provides a controlled low pressure to the various control assemblies. Thus the solenoid valve and associated components can be more economical than in those systems where only the normal line pressure arrangement is used.

19 Claims, 4 Drawing Figures

HYDRAULIC CONTROL SYSTEM
51

HYDRAULIC CONTROL SYSTEM FOR CONTINUOUSLY VARIABLE TRANSMISSION

RELATED APPLICATIONS

This application is a continuation of the application filed Apr. 29, 1985, Ser. No. 728,533, which was a continuation of the application filed Sept. 22, 1982, Ser. No. 421,198, both with the same title and inventor, both assigned to the assignee of this application, and both of which are now abandoned.

BACKGROUND OF THE INVENTION

Various types of adjustable-diameter pulley transmissions have been developed and used. In general, such transmissions take the form of two adjustable pulleys, each pulley having a sheave which iw axially fixed and another sheave which is axially movable relative to the first sheave. A flexible belt of metal or elastomeric material is used to intercouple the pulleys. The interior faces of the pulley sheaves are beveled or chamfered so that, as the axially displaceable sheave is moved, the distance between the sheaves and thus the effective pulley diameter is adjusted. The displaceable sheave includes a fluid-constraining chamber for receiving fluid to increase the effective pulley diameter, and when fluid is exhausted from the chamber, the pulley diameter is decreased. Generally the effective diameter of one pulley is adjusted in one direction as the effective diameter of the second pulley is varied in the opposite direction, thereby effecting a change in the drive ratio between an input shaft coupled to an input pulley and the output shaft coupled to the output pulley.

Various refinements were gradually evolved for the hydraulic control system which is used to pass fluid into the fluid-holding chamber of each adjustable pulley. One example of such a hydraulic control system is U.S. Pat. No. 3,115,049—Moan. The patentee utilizes two valves to control the secondary pulley adjustable sheave, to regulate the belt tension, and one valve to regulate fluid into and out of the primary sheave chamber, to regulate the transmission ratio. Subsequently U.S. Pat. No. 4,152,947—van Deursen et al was issued, teaching one valve to control the belt tension. In both these references the line pressure of the fluid applied to hold the belt tension by pressurizing the secondary chamber is relatively high. Thus an application entitled "Control System for Continuously Variable Transmission", Ser. No. 257,035, was filed Apr. 24, 1981, and assigned to the assignee of this invention; that application issued June 11, 1985 as U.S. Pat. No. 4,522,086. That application describes an improved control system which reduces the main line fluid pressure supplied to the secondary sheave chamber as a function of torque demand.

With these various control systems taught in the art, there still remains a need for a cost-effective, efficient control system which reduces the line pressure applied to the secondary sheave chamber to a low, but safe, operating pressure, and utilizes a lower control pressure for other portions of the hydraulic control system. It is to the provision of such an improved control system, with the lower pressure in a control line of the hydraulic control system, that the present invention is primarily directed.

SUMMARY OF THE INVENTION

A control system constructed in accordance with the present invention is particularly useful with a continuously variable transmission (CVT) having primary and secondary pulleys, with a belt intercoupling these pulleys. A chamber in the primary pulley admits and discharges fluid to change the effective pulley diameter and thus correspondingly change the transmission ratio. Similarly a chamber is provided in the secondary pulley for admitting and discharging fluid to maintain tension in the belt as the transmission is driven. A main fluid line is connected to supply fluid under pressure to the secondary pulley chamber.

Particularly in accordance with the present invention, a pump is connected to supply fluid under pressure to the main line. A control pressure line is provided and a modulator valve is coupled between the main line and this control pressure line. The modulator valve establishes a pressure of the fluid in the control pressure line which is substantially constant. A pump control assembly is coupled between the control pressure line and the pump, to regulate the pressure in the main line. In accordance with another aspect of the invention, the pump can be a variable displacement pump.

THE DRAWINGS

In the several figures of the drawings, like reference numerals identify like components, and in those drawings.

GENERAL SYSTEM DESCRIPTION

Figure 1:
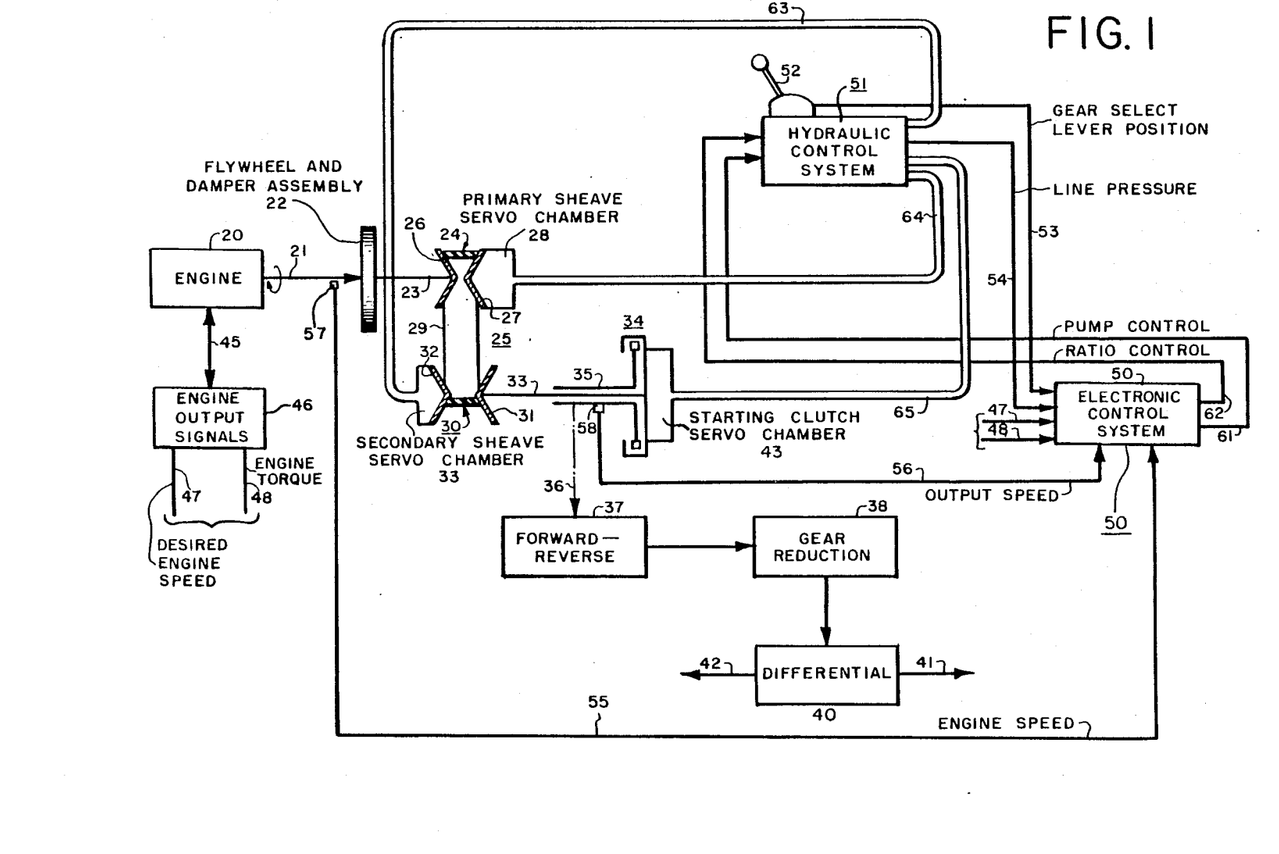
FIG. 1 is a block diagram showing the hydraulic control system of this invention and its relation to components of the continuously variable transmission.

FIG. 1 shows the general power flow in an automotive layout from an engine 20 over a shaft 21, flywheel-and-damper assembly 22 and transmission input shaft 23 to drive primary pulley 24 of a continuously variable transmission 25. Input or primary pulley 24 has a fixed sheave 26 and a movable sheave 27, with a primary sheave servo chamber 28 positioned to admit and discharge oil and thus adjust the position of movable sheave 27. Secondary or output pulley 30 has an axially fixed sheave 31 and an axially movable sheave 32, with a secondary sheave servo chamber 33 positioned to admit and discharge fluid to change the effective diameter of pulley 30. A belt 29 of metal or suitable elastomeric material intercouples pulleys 24 and 30. The output of secondary pulley 30 is supplied over shaft 39, in turn coupled to one side of clutch 34, the other side of which is coupled to a sleeve or quill shaft 35. Drive from this shaft is translated over a gear set (not shown)

represented by dash-dot line 36 to a forward-reverse gear selector assembly 37. Drive is passed from this selector assembly through a gear reduction stage 38 to a differential assembly 40, which passes output drive over shafts 41, 42 to the wheels (not shown) of the vehicle in which the control system of the invention is mounted. This drive train, from engine 20 to shafts 41,42 is completed when oil under pressure is admitted into starting clutch servo chamber 43.

The operating conditions of the engine are denoted by electrical signals provided over a plurality of electrical conductors in a cable 45 to stage 46, which includes well-known signal processing components to provide engine output signals including a "desired engine speed" signal on line 47 and an "engine torque" signal on line 48. The torque signal can be developed from the output of a suitable torque sensor, such as that described and claimed in U.S. Pat No. 4,100,794. Alternatively, the torque can be inferred from some other parameter such as engine manifold pressure. The desired engine speed signal is developed by comparing the instantaneous operating conditions of the engine against an idealized set of conditions stored in an electronic memory (or "map"), to develop a desired speed signal for application with the torque signal to an electronic control system 50. This electronic control system operates jointly with a hydraulic control system 51 to regulate transmission operation and control the engine operation.

A manual gear selector lever 52 mounted on hydraulic control system 51 operates both to actuate certain components in system 51 and to send a signal denoting the position of lever 52 over line 53 to electronic control system 50. Preferably the signal on line 53 is electronic but of course it can be mechanical or fluidic if desired. Another signal, indicating a line pressure of the main fluid line in hydraulic control system 51, is supplied over line 54 to the electronic control system 50. Other input signals to the electronic control system are provided over conductors 55 and 56. A conventional position sensor 57 is located adjacent engine output shaft 21, to provide on line 55 a signal which varies as the engine speed. Because of the solid coupling through the flywheel-and-damper assembly to input pulley 24, the signal on line 55 can also be considered the transmission input speed. Another sensor 58 is positioned adjacent clutch output shaft 35, to provide on line 56 an output speed signal, denoting the speed of the transmission output shaft 39 when clutch 34 is engaged. Of course sensor 58 can be positioned anywhere between sleeve shaft 35 and drive shafts 41, 42 to provide the output speed signal. After operating on these several input signals, electronic control system 50 provides a pair of output control signals on lines 61, 62 for application to hydraulic control system 51. The signal on line 61 is a "pump control" signal to regulate the operation of a variable displacement pump within the hydraulic control system, to produce the line pressure which is then monitored over line 54. The other output signal on line 62 is a "ratio control" signal, used to establish the desired ratio of CVT 25. When the fluid under line pressure is produced by hydraulic control system 51, this fluid is passed through conduit 63 to secondary sheave servo chamber 33, to hold the proper tension in belt 29. The hydraulic control system also provides the appropriate fluid through line 64 to primary sheave servo chamber 28 to govern ratio changes, or maintain a steady ratio, of CVT 25. In addition, a third fluid signal through conduit 65 is provided to starting clutch servo chamber 43, to apply this clutch and complete the transfer of power through the drive train as described above.

DETAILED DESCRIPTION OF THE INVENTION

Figure 2:
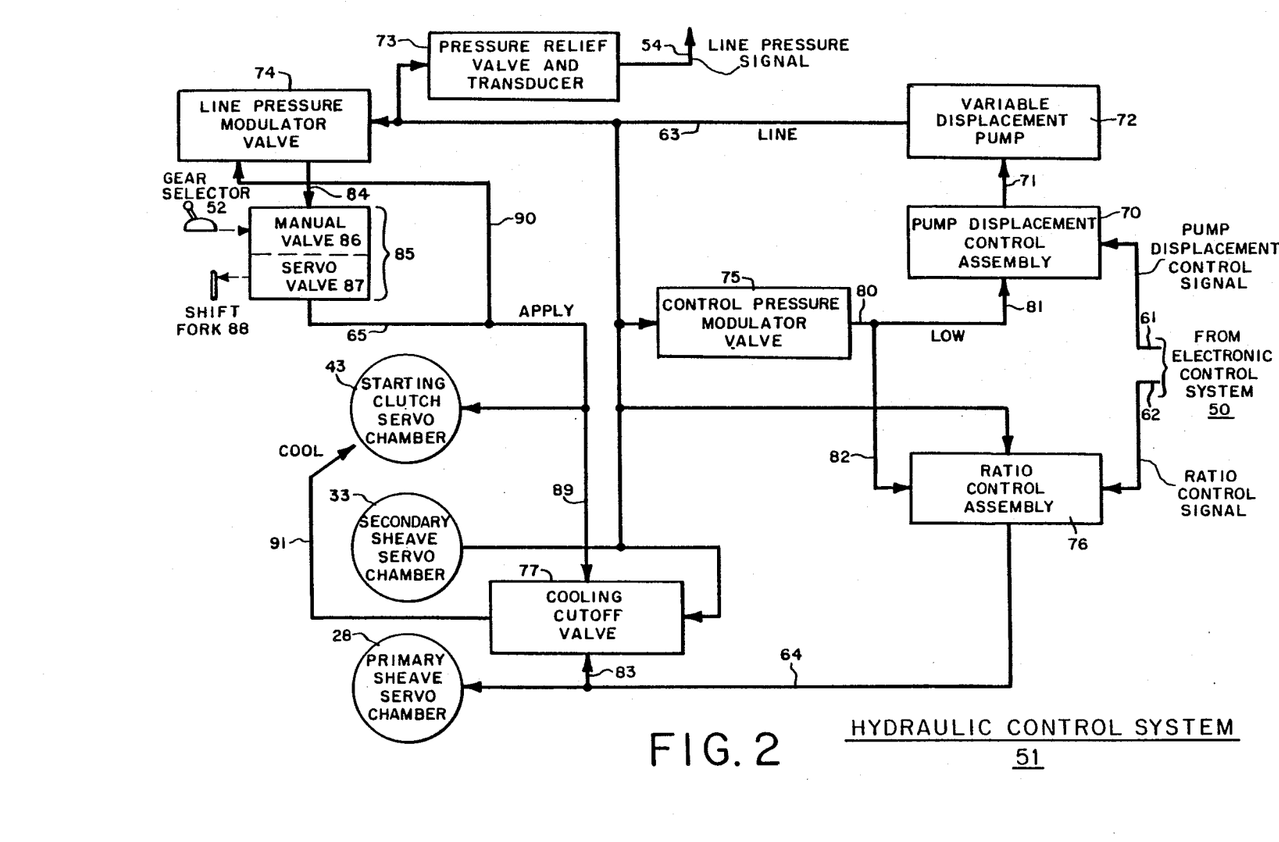
FIG. 2 is a block diagram depicting the relationship of major components in the hydraulic control system of this invention.

In FIG. 2 various components and subsystems of hydraulic control system 51 are depicted. As there shown, the pump displacement control signal received over line 61 from the electronic control system is applied to a pump displacement control assembly 70, a valve assembly which will be described hereinafter. The output from this control assembly is a modulating signal passed through a conduit 71 to control the output of a variable displacement pump 72, thus regulating the flow in main line 63. Any suitable variable displacement pump can be utilized, and one example is the pump described and taught in U.S. Pat. No. 2,700,341. In that patent the control signal is derived through a pipe 28 from an engine intake manifold, but the basic pump operation as a function of the modulating signal on line 71 of this application is exactly the same.

Accordingly, fluid at line pressure is supplied through main line 63 to pressure relief valve and transducer assembly 73; line pressure modulator valve 74; control pressure modulator valve 75; ratio control assembly 76; secondary sheave servo chamber 33; and cooling cutoff valve 77. Control pressure modulator valve 75 is a conventional unit which operates to provide a regulated pressure in control line 80 which is substantially constant. This low pressure in control line 80 is constant over virtually the entire range of pump 72, and makes possible the use of more economical solenoid valves, as will be explained. The lower pressure fluid in line 80 is applied through line 81 to pump displacement control assembly 70, and through line 82 to ratio control assembly 76. Valve assembly 76 also receives the ratio control signal over line 62 from the electronic control system, and the output signal from assembly 76 is a controlled pressure in line 64 which is passed to primary sheave servo chamber 28 to regulate the ratio of the CVT. The pressure in line 64 is also applied, through line 83, to cooling cutoff valve 77.

Line pressure modulator valve 74 receives line pressure through line 63 and applies an output pressure through line 84 to an assembly 85, which includes a manual valve 86 and a servo valve 87. Manual valve 86 is displaced as gear selector 52 is displaced, and passes fluid to a fluid motor (not shown) associated with servo valve 87 to effect displacement of shift fork 88. This shift fork movement effects selection of a gear train, such as a forward or reverse connection, in a manner well-known and understood by those skilled in the art. Details and an operating description of the assembly 85, and its association with line pressure modulator valve 74, are set out in the copending application of William J.

Haley and Guenter J. Neumann entitled "Hydraulic Power Shift System", filed Aug. 6, 1982, which received Ser. No. 405,797, which issued May 7, 1985 as U.S. Pat. No. 4,515,255. For purposes of the present description, it is sufficient to understand that movement of gear selector 52 results in operation of assembly 85 so that shift fork 88 is displaced to engage the appropriate gear train, and only at the end of travel of servo valve 87 is the fluid under pressure passed through apply line 65 to starting clutch servo chamber 43 to effect application of this clutch. The fluid signal in line 65 is also passed through line 89 to cooling cutoff valve 77, and through line 90 to line pressure modulator valve 74. This last signal in effect displaces valve 74 into a bypass position so that, after the clutch is applied, fluid at line pressure is passed from line 63 directly through valve 74 and line 84 to manual valve 86. When cooling cutoff valve 77 is in the appropriate position, fluid from main line 63 is passed through valve 77 and conduit 91 to cool the clutch.

Figure 3:
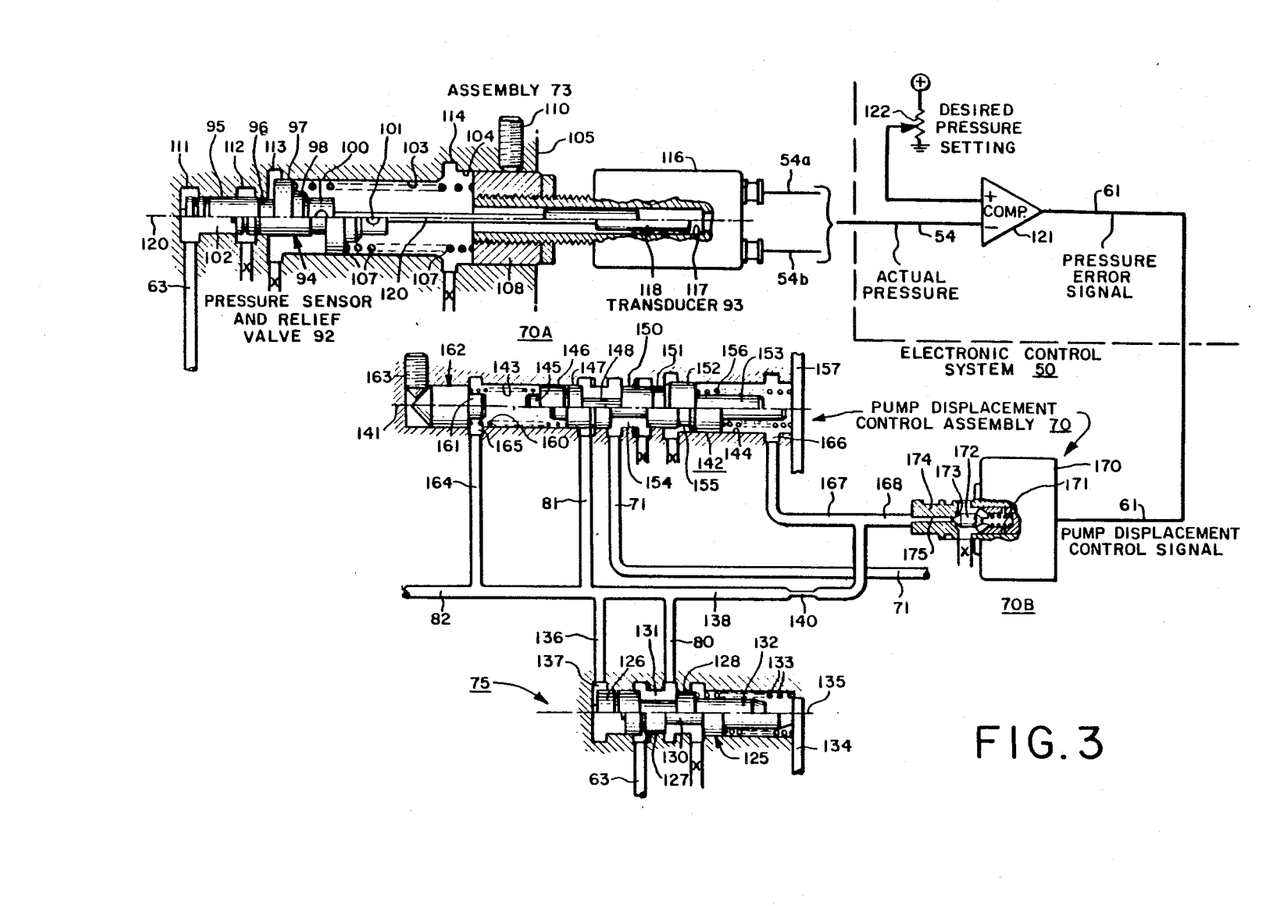
FIGS. 3 and 4 are schematic diagrams depicting details of various system components shown more generally in FIG. 2.

FIG. 3 depicts two related subsystems, one (73) in which the main line pressure is sensed, and another (70) which uses information from the first to govern the variable displacement pump. Control pressure modulator valve 75 is also shown in FIG. 3.

Considering first the pressure relief valve and transducer assembly 73, this assembly comprises a pressure sensor and relief valve 92 coupled to a transducer 93. Valve 92 includes a spool 94 having a first land 95, a reduced-diameter portion 96 connecting land 95 with a second, larger-diameter land 97, a reduced-diameter annular portion 98 abutting land 97, and a stem 100 defining a tapped bore for receiving a set screw 101. Land 95 is received in a first bore portion 102 of the valve assembly, and land 97 is received in the larger-diameter bore portion 103 of this valve. A still larger bore section 104 extends to the end wall 105 of this valve assembly. A spring 107 is inserted as shown, with one end bearing against one side of land 97 and the other end abutting an interior end wall of a collar 108. A set screw 110 is provided to fasten collar 108 in position. The described arrangement affords easy assembly of the valve unit 92 and ensures zero deflection of spring 107 at installation. That is, spool 94 is first dropped in so that land 95 enters the bore section 102, and then spring 107 is inserted over sections 98, 100, and allowed to rest on land 97. Collar 108 is then inserted in the large bore section 104 until the end wall of this collar rests on the other end of spring 107. In this position screw 110 is tightened so that there is zero loading of spring 107 at this time. This allows for proper initial adjustment of the spring, which may have slightly different free length variations as it is manufactured and installed in production quantities.

Port 111 connects main line 63 with bore section 102. Ports 112, 113, and 114 are all connected to sump or exhaust, represented by an x in the associated discharge line for each port.

Transducer 93 is a simple position transducer. The transducer includes a housing 116 and an interior bore 117 in which a slug or cylindrical inductor 118 can ride. Slug 118 is mechanically affixed to a steel rod or a thin plate 120, the other end of which is affixed to stem 100 of spool 94. In production valves set screw 101 could be omitted, and its function accomplished by a weak spring positioned to urge plate 120 against stem 100. Accordingly, when the spool is displaced as a function of pressure in line 63, slug 118 is correspondingly displaced to vary the inductance of an associated circuit (not shown) to provide the actual pressure signal on output conductors 54a, 54b of the transducer. This corresponds to the actual line pressure signal shown on line 54 in FIGS. 1 and 2. Such transducers are well-known in this art. For example a suitable position transducer is available from Transducer Systems, Inc., of Willow Grove, Pa. Of course, a linear travel potentiometer could be substituted for the described variable inductor transducer, or other suitable transducers can be used. It is only necessary that the transducer provide an electrical signal which varies as some function of line pressure variations in main conduit 63.

Before the system begins to operate, there is no pressure in conduit 63, and spool 94 is in its far left position, as shown above center line 120 in FIG. 3. Spring 103 maintains the spool in this position. Spring 103 has a rate which determines the increment of spool movement for each increment of pressure change in line 63. Accordingly, as the pressure in conduit 63 begins to rise, this pressure is exerted against the left end of spool 94 and the spool is displaced to the right until the fluid pressure no longer overcomes spring 107, and spool 94 achieves a balanced position. This position is sensed by slug 118 and the associated circuit, as just described, to provide on line 54 an electrical signal denoting the actual fluid pressure in line 63. An additional feature of valve 92 is that if the line pressure in conduit 63 exceeds the normal maximum by some fixed amount, spool 94 will be displaced additionally to the right by an amount sufficient to directly exhaust the pump pressure line.

The actual line pressure signal on line 54 is applied to one input terminal of a comparator 121 in electronic control system 50 (FIG. 1). The other input terminal of this comparator is coupled to the adjustable arm of a potentiometer 122, from which the desired line pressure setting is derived. The output of comparator 121 is an error signal on line 61, which is also the pump displacement control signal, for passage back to the hydraulic control system for use as will be described to regulate the pressure in line 63. Accordingly, there is a closed-loop control system for continuously regulating the pressure in line 63 in accordance with the actual operating conditions encountered when the continuously variable transmission is operated.

Those skilled in the art will appreciate that the means for setting the desired pressure signal can be something other than a simple potentiometer. By way of example this device can be replaced by a circuit arrangement which senses various operating conditions of the associated engine and/or transmission, and operates upon signals denoting the sensed conditions to provide a resultant pressure setting signal for application to comparator 121.

In the center of FIG. 3 is pump displacement control assembly 70, which comprises a fluid control valve 70A and a solenoid valve 70B. Together these two valves comprise a control assembly which receives a pump displacement control signal over line 61 (electrically the same as the pressure error signal developed in the electronic control system), and also receives a fluid at a controlled, low pressure from control pressure modulator valve 75, passed through lines 80, 81 to valve 70A. The output of assembly 70 is a fluid control signal in line 71 which is applied to the variable displacement pump to regulate the output of this pump, and thus control the flow through main line 63. To understand the application of the low pressure fluid to assembly 70, the control pressure modulator valve 75 will first be described.

Valve 75 includes a spool 125 with a first land 126 and a second land 127, separated by a small pressure relief groove. Another land 128 is connected by a reduced-diameter portion 130 to land 127, defining a groove 131 between lands 127, 128. A cylindrical stem 132 extends from land 128 to the end of spool 125, and a spring 133 is inserted to encircle stem 132, being retained between land 128 and an end plate 134, inserted after the valve components are assembled. Spool 125 is shown before the system pressure is applied above center line 135, and below the center line the spool is shown in the other extreme condition, with spring 133 compressed. A feedback channel 136 is coupled to port 137 at the left end of the valve body, to return fluid under controlled pressure to the left end of the valve spool when the system is operating.

In operation, as the system is initially energized spool 125 is in the upper position shown in FIG. 3, toward the left end of the valve bore. As the system pump begins to operate and supply fluid under pressure through main line 63, this fluid is passed through groove 131 and outlet channel 80, and fed back through channel 136 to the left end of spool 125. This moves spool 125 to the right, reducing the flow through channel 80 as the spool is moved and spring 133 is compressed. The extent of movement is a function of the rate of spring 133, and thus the controlled low pressure developed in line 80 and supplied to other portions of the system is a function of this spring force. Spool 125 will stop in a central position to regulate the low pressure in line 80 in a stable manner. The low pressure fluid in control line 80 is passed through channel 81 to valve 70A, through line 82 to ratio control assembly valve 76, and through line 138 to an orifice 140 which is a part of the control arrangement for pump displacement control assembly 70.

Considering fluid valve 70A of pump displacement control assembly 70, the portion of this valve above center line 141 depicts the components in the extreme left position and the portion below the center line indicates the valve spool displaced to the extreme right position. Valve 70A has a spool assembly 142 received in a bore having a first portion 143 of given diameter, and a second, larger-diameter portion 144. Spool 142 includes a stem portion 145 at the left end, first and second lands 146, 147, a reduced-diameter portion 148, a third land 150, another reduced-diameter portion 151, a fourth, larger diameter land 152, and a stem extension 153 at the right end of the spool. A groove 154 is defined between lands 147, 150, and a smaller groove 155 is defined between lands 150, 152. A first spring 156 is inserted over stem 153, and bears at its right end against a plate 157. At its other end spring 156 bears against land 152 of spool 142.

At the left end of spool 142 is another spring 160, inserted over stem 145 and bearing against land 146. At its other end spring 160 encircles stem 161 of an end plug 162. A set screw 163 is provided to adjust the position of plug 162, and hence the initial position of spring 160, to provide an adjustment for the initial force applied to the left end of the spool by this spring. A channel 164 is coupled between line 82 and port 165 at the left end of spool 142, to provide fluid under pressure which augments the force of the spring applied to the left side of the spool. At the right end of spool 142, the chamber in which spring 156 is positioned communicates through port 166 with line 167, in turn connected both to orifice 140 and, over line 168, to one side of solenoid valve 70B. This solenoid valve includes a housing 170, a winding (not shown) for receiving the pump displacement control signal, and an armature terminating in a valve seat closure element 172. A spring 171 is positioned to urge seat 172 against a cylindrical body portion 174 of the solenoid valve, effectively closing off orifice 173. As the solenoid is energized, seat 172 is displaced to the right as a function of the pump displacement control signal, to control the effective size of orifice 173. In the position illustrated valve seat 172 abuts cylindrical body 174, effectively closing central channel 175 from communication with line 168. At the present time it is preferred to use a less-expensive conventional solenoid valve as the component 70B, and utilize pulse-width modulation to vary the energization of the solenoid winding and thus the position of valve seat 172. Thus valve 70B functions, in effect, as a controlled variable orifice which vents a portion of the fluid in line 168 directly to sump, thus regulating the pressure supplied to modify the effect of springs 156 at the right end and 160 at the left end of spool 142.

In operation, as spool 142 is designed it is generally in a centered position. As the main line 63 supplies fluid under line pressure to modulator valve 75, this valve operates as already described to provide the controlled, low pressure fluid in line 80, and through lines 81, 138 and 164 to pump displacement control assembly 70. Fluid in line 81 is passed directly through groove 154 to line 71, thus providing the appropriate output control signal to regulate operation of variable displacement pump 72. Fluid under pressure is also supplied through line 164 to the left end of spool 142, to augment the force of spring 160 and urge spool 142 to the right, against the combined pressures of spring 156 and the effective pressure in line 167 as determined by operation of solenoid valve 70B. Spool 142 seeks a position at which these several spring and fluid forces are balanced, thus modulating the control signal on line 71 to the variable displacement pump. In that the pressure in lines 81 and 164 is regulated by modulator valve 75, it is apparent that the output control signal in line 71 is a function of the pump displacement control signal on line 61 which controls the effective size of orifice 173, thus determining the total pressure on the right end of spool 142.

Figure 4:
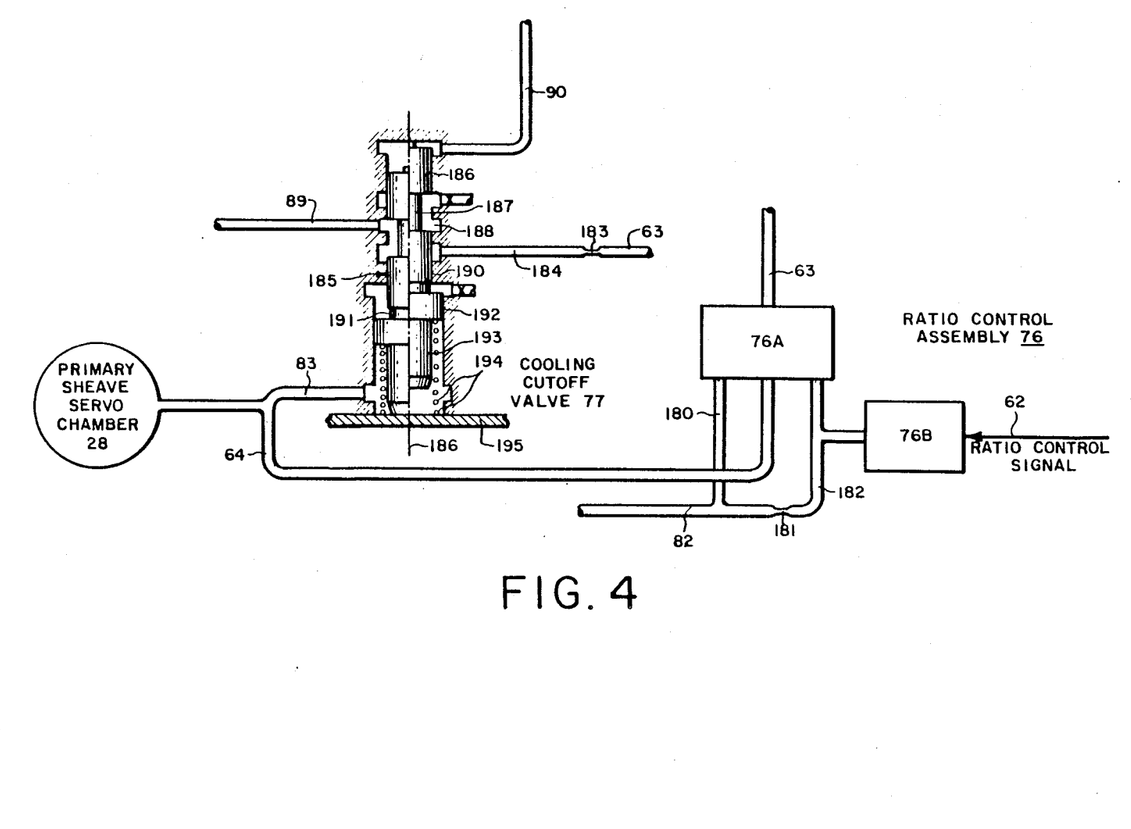

FIG. 4 shows in a general way the intercoupling of fluid control valve 76A and its associated solenoid valve 76B to regulate the fluid pressure in line 64 to the primary sheave servo chamber 28, and also shows details of the cooling cutoff valve 77. Details of the valves 76A, 76B are not illustrated because these are precisely the same as those of valve assembly 70A, 70B already described in connection with FIG. 3. The only difference is that the source oil for valve 70A is the controlled, low pressure fluid in line 81 provided by modulator valve 75, whereas in FIG. 4 the source oil for valve 76A is oil at main line pressure in line 63. The controlled low pressure oil from modulator valve 75 is supplied through line 82 and channel 180 to one end of valve 76A, through an orifice 181 and its associated line 182 to one side of a solenoid valve 76B, and also to the right end of fluid control valve 76A. Accordingly, as a function of the ratio control signal received over line 62 from electronic control system 50, ratio control assembly 76 operates to produce a controlled fluid pressure in line 64 for actuating the primary sheave servo and controlling the ratio in the CVT, and this oil is also applied through line 83 to the bottom of cooling cutoff valve 77.

Oil at main line pressure in line 63 is passed through orifice 183 and line 184 to cooling cutoff valve 77. When spool 185 is in the down position, as shown to the left of center line 186, a path is completed for cooling oil to flow through line 91 and effect cooling of the clutch.

Spool 185 includes a first land 186, a reduced-diameter portion 187 providing a groove 188, a second land 190, a slightly-reduced diameter portion 191, and a final land 192, larger in diameter than the other lands. A cylindrical stem 193 protrudes from the end of land 192. A bias spring 194 is positioned around stem 193, abutting one side of land 192 and retained by end plate 195.

At the outset, before any pressurized oil is in the system, spring 194 urges spool 185 upwardly, and land 190 effectively blocks communication between lines 184 and 91, so there is no application of cooling oil to the clutch at this time. At start up the transmission is generally in park or in neutral, and it is important in this type of transmission that there be no viscous drag of the cooling oil on the clutch during shifting, into either forward or reverse. Thus for basic efficiency considerations, the cooling oil is shut off not only when the transmission is being shifted, but also when the CVT has come up to operating speed and the starting clutch is essentially "locked up". It is necessary to provide a profuse flow of cooling oil to the clutch during the time it is slipping and absorbing energy, that is, during every acceleration from a stop, and during "stall" conditions.

Considering again FIG. 2, after selection of forward or reverse gear is made with gear selector 52, operation of the manual and servo valves is effective to provide clutch apply oil in line 65 to starting clutch servo chamber 43. At the same time this oil is applied through line 89 as shown in the upper portion of FIG. 4, to the upper end of spool 185, urging this spool downwardly against the bias force of spring 194 into the lower position, shown to the left of center line 186. In this position there is communication from line 184 through groove 188 to output line 91 providing a heavy flow of cooling oil through line 91 to the starting clutch. This flow continues while the vehicle in which the CVT is mounted accelerates, until the ratio of the transmission begins to change from underdrive to overdrive. At the commencement of ratio changing the clutch is, in effect, locked up, and it is no longer slipping; hence the flow of cooling oil can be terminated. To initiate the ratio change the oil pressure in line 64 rises to a level sufficient so that, with application of this pressure through line 83 to the bottom of land 192, this fluid pressure combines with the bias force of spring 194 to again urge spool 185 upwardly, closing off communication between The lines 184 and 91, and terminating the application of cooling oil to the clutch. If the vehicle decelerates and causes a downshift to a lower ratio where clutch slipping can occur and cooling oil is again required, the ratio-controlling pressure in lines 64 and 83 decreases, and the spool 185 is urged downwardly to again provide communication between lines 184 and 91, with consequent flow of the cooling oil.

TECHNICAL ADVANTAGES

The pump pressure control system of the invention is a closed loop system, as shown in the upper portion of FIG. 3, in which the actual line pressure in conduit 63 is sensed by the joint operation of valve 92 and transducer 93, providing the electrical signal to the electronic control system 50 for comparison with the desired pressure setting. If there is a difference between the desired and actual pressure levels, the signal on line 61 regulates the pump displacement control assembly 70 to appropriately control the line pressure in conduit 63. In addition the capacity of the starting clutch is also controlled as a function of the pressure in conduit 63. Thus the secondary sheave sero chamber 33 essentially receives fluid at the same pressure as does starting clutch servo chamber 43 when the system is in the drive mode, and the springs and respective piston areas of these two servo chambers are designed such that the starting clutch has less torque capacity for a given apply pressure than does the secondary sheave servo chamber, so that the clutch serves as a "fuse" to protect belt 29. At idle and at start-up, the pump pressure in line 63 controls slippage of the starting clutch and engagement of the clutch. In the driving mode, operation of pump displacement control assembly 70 maintains a safe operating pressure in line 63 consistent with speed, transmission ratio, and input torque.

The ratio control system, like the pressure control system, is a closed loop system. The comparator for this portion of the system is exactly like the comparator 121 in the pressure control loop, and thus it was not illustrated in the drawings. In general the ratio control system utilizes signals denoting the input and output speeds of the transmission, compares these signals against the desired operating conditions, and produces on line 62 a ratio control signal to provide the desired ratio of the CVT. Every time the vehicle is started from a standing stop the transmission is in full low or underdrive ratio;

that is, there is no pressure in primary sheave servo chamber 28. When the vehicle accelerates and an upshift commences, the pressure required in the primary sheave to overcome the pressure in the secondary sheave chamber is more than sufficient to trigger the starting clutch cooling cutoff valve 77 and terminate flow of the cooling oil.

Use of the low pressure fluid in line 80 provides a substantial advantage over earlier systems, as this pressure can be of the order of 50 pounds per square inch (p.s.i.). The pressure in line 63 can range from about 50 to 250 p.s.i. to provide the requisite pressure in the secondary sheave servo chamber and in the starting clutch chamber. Smaller components (such as the solenoid valves) and smaller lines can be utilized because the low pressure fluid in control line 80 is approximately equal to the lowest pressure in the main conduit 63, and is controlled by control pressure modulator valve 75.

In the appended claims the term "connected" (when used in an electrical or electronic sense) means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A control system for a continuously variable transmission having a primary pulley and a secondary pulley, each pulley having a pair of sheaves and an effective diameter adjustable as a function of axial displacement of one of said sheaves relative to the other of said sheaves, a belt intercoupling the pulleys, a fluid chamber in the primary pulley for admitting and discharging fluid to change the effective pulley diameter and correspondingly change the transmission ratio, a fluid chamber in the secondary pulley for admitting and discharging fluid to maintain tension in the belt as the transmission is driven, and a main line connected to supply fluid under pressure to the secondary pulley fluid chamber, characterized by a variable displacement pump connected to supply fluid under pressure to said main line, a control line, means including a modulator valve for establishing in said control line a fluid pressure which is regulated to be substantially constant, and means, including a pump displacement control assembly coupled between said control line and said variable displacement pump, for regulating the pressure in said main line.

2. A control system as claimed in claim 1, and further comprising a transducer, coupled to said main line, providing an electrical signal which varies as a function of the pressure in said main line, said pump displacement control assembly comprising a fluid control valve for providing a regulating signal to said variable displacement pump, and means, including a solenoid valve coupled between said fluid control valve and said transducer, for regulating operation of the variable displacement pump as a function of the signal provided by the transducer.

3. A control system as claimed in claim 2, and further comprising a comparator, coupled between said transducer and said solenoid valve, for providing a pump displacement control signal which varies as a function of the difference between the actual pressure in said main line and a desired pressure level.

4. A control system as claimed in claim 1, and further comprising a ratio control assembly, coupled between said main line and the primary pulley chamber, for controlling the flow of fluid into and out of the primary pulley fluid chamber to regulate the ratio of the continuously variable transmission.

5. A control system for a continuously variable transmission having a primary pulley and a secondary pulley, a belt intercoupling the pulleys, a chamber in the primary pulley for admitting and discharging fluid to change the effective pulley diameter and correspondingly change the transmission ratio, a chamber in the secondary pulley for admitting and discharging fluid to maintain tension in the belt as the transmission is driven, and a main line connected to supply fluid under pressure to the secondary pulley fluid chamber, characterized by a variable displacement pump connected to supply fluid under pressure to said main line, a control line, means including a modulator valve for establishing in said control line a fluid pressure which is regulated to be substantially constant, means including a pump displacement control assembly coupled between said control line and said variable displacement pump, for regulating the pressure in said main line, and a ratio control assembly, coupled between said main line and the primary pulley chamber, for controlling the flow of fluid into and out of the primary pulley chamber to regulate the ratio of the continuously variable transmission, in which said ratio control assembly comprises a fluid control valve, connected to receive fluid from said main line and also fluid from said control line, and a solenoid valve coupled to said fluid control valve, for regulating operation of the fluid control valve and thus controlling the transmission ratio as a function of a received ratio control signal.

6. A control system for a continuously variable transmission having a primary pulley and a secondary pulley, a belt intercoupling the pulleys, a chamber in the primary pulley for admitting and discharging fluid to change the effective pulley diameter and correspondingly change the transmission ratio, a chamber in the secondary pulley for admitting and discharging fluid to maintain tension in the belt as the transmission is driven, and a main line connected to supply fluid under pressure to the secondary pulley fluid chamber, characterized by a variable displacement pump connected to supply fluid under pressure to said main line, a control line, means including a modulator valve for establishing in said control line a fluid pressure which is regulated to be substantially constant, means, including a pump displacement control assembly coupled between said control line and said variable displacement pump, for regulating the pressure in said main line, and a starting clutch coupled to said secondary pulley, said starting clutch including a servo chamber, and a cooling cutoff valve, coupled between said main line and said starting clutch, for providing a flow of cooling oil to the starting clutch when the cooling cutoff valve is in the appropriate position.

7. A control system as claimed in claim 6, and further comprising a fluid connection between said starting clutch servo chamber and the cooling cutoff valve, to ensure that flow of cooling oil to the starting clutch is not commenced until the starting clutch is applied.

8. A control system as claimed in claim 7, and further comprising a fluid connection between the primary pulley fluid chamber and the cooling cutoff valve, to ensure that flow of cooling oil to the clutch is terminated after the clutch is no longer slipping.

9. A control arrangement for a continuously variable transmission in which torque is transferred from an engine to a primary pulley, having an axially fixed sheave and an axially movable sheave with a chamber for admitting and discharging fluid, a secondary pulley having an axially fixed sheave and an axially movable sheave with a chamber for admitting and discharging fluid, a belt intercoupling the pulleys, the tension in the belt being maintained by the fluid pressure in the secondary pulley chamber, a starting clutch including a chamber for admitting and discharging fluid to regulate the transfer of drive torque from the secondary pulley through an associated vehicle drivetrain, an electronic control system connected to receive a plurality of information signals and to provide at least two output signals, and a hydraulic control system, connected to receive the output signals from the electronic control system and to regulate fluid under pressure individually applied to the primary pulley chamber, the secondary pulley chamber, and the starting clutch chamber, in which the hydraulic control system is characterized by
a main line connected to supply fluid under pressure to the secondary pulley movable sheave chamber,
a variable displacement pump connected to supply fluid under pressure to said main line,
a control line,
means, including a modulator valve coupled to said main line, for establishing a fluid pressure in said control line which is substantially constant and approximately equal to the lowest pressure in said main line, and
means, including a pump displacement control assembly coupled between said control line and said variable displacement pump, for regulating the pressure in said main line.

10. A control arrangement as claimed in claim 9, and further comprising a transducer, coupled to said main line, for providing an electrical signal which varies as a function of the pressure in said main line, said pump displacement control assembly comprising a fluid control valve for providing a regulating signal to said variable displacement pump, and means, including a solenoid valve coupled between said fluid control valve and said transducer, for regulating operation of the variable displacement pump as a function of the signal provided by the transducer.

11. A control system as claimed in claim 10, and further comprising means for setting a desired pressure level in said main line, and a comparator stage, coupled between said transducer and said solenoid valve, for providing a pump displacement control signal which varies as a function of the difference between the actual pressure in said main line and the desired pressure level.

12. A control system as claimed in claim 10, and further comprising a ratio control assembly, coupled between said main line and the primary pulley movable sheave chamber, for controlling the flow of fluid into and out of the primary pulley movable sheave chamber to regulate the ratio of the continuously variable transmission.

13. A control arrangement for a continuously variable transmission in which torque is transferred from an engine to a primary pulley, having an axially fixed sheave and an axially movable sheave with a chamber for admitting and discharging fluid to regulate the effective primary pulley diameter, a secondary pulley having an axially fixed sheave and an axially movable sheave with a chamber for admitting and discharging fluid, a belt intercoupling the first and second pulleys, the tension in the belt being maintained by the fluid pressure in the secondary pulley chamber, a starting clutch including a chamber for admitting and discharging fluid to regulate the transfer of drive torque from the secondary pulley through an associated vehicle drivetrain, an electronic control system connected to receive a plurality of information signals and to provide at least two output signals, and a hydraulic control system, connected to receive the output signals from the electronic control system and to regulate fluid under pressure individually applied to the primary pulley chamber, the secondary pulley chamber, and the starting clutch chamber, in which the hydraulic control system is characterized by
a main line connected to supply fluid under pressure to the secondary pulley movable sheave chamber,
a variable displacement pump connected to supply fluid under pressure to said main line,
a control line,
means, including a modulator valve coupled to said main line, for establishing a fluid pressure in said control line which is substantially constant and approximately equal to the lowest pressure in said main line,
means, including a pump displacement control assembly coupled between said control line and said variable displacement pump, for regulating the pressure in said main line,
a transducer, coupled to said main line, for providing an electrical signal which varies as a function of the pressure in said main line, said pump displacement control assembly comprising a fluid control valve for providing a regulating signal to said variable displacement pump,
means, including a solenoid valve coupled between said fluid control valve and said transducer, for regulating operation of the variable displacement pump as a function of the signal provided by the transducer, and a ratio control assembly, coupled between said main line and the primary pulley movable sheave chamber, for controlling the flow of fluid into and out of the primary pulley movable sheave chamber to regulate the ratio of the continuously variable transmission, in which said ratio control assembly comprises a fluid control valve, connected to receive fluid from said main line and also fluid from said control line, and a solenoid valve coupled to said fluid control valve, for regulating operation of the fluid control valve and thus controlling the transmission ratio as a function of a received ratio control signal.

14. A control arrangement for a continuously variable transmission in which torque is transferred from an engine to a primary pulley, having an axially fixed sheave and an axially movable sheave with a chamber for admitting and discharging fluid to regulate the effective primary pulley diameter, a secondary pulley having an axially fixed sheave and an axially movable sheave with a chamber for admitting and discharging fluid, a belt intercoupling the first and second pulleys, the tension in the belt being maintained by the fluid pressure in the secondary pulley chamber, a starting clutch including a chamber for admitting and discharging fluid to regulate the transfer of drive torque from the secondary pulley through an associated vehicle drivetrain, an electronic control system connected to receive a plurality of information signals and to provide at least two output signals, and a hydraulic control system, connected to receive the output signals from the electronic control system and to regulate fluid under pressure individually applied to the primary pulley chamber, the secondary pulley chamber, and the starting clutch chamber, in which the hydraulic control system is characterized by
a main line connected to supply fluid under pressure to the secondary pulley movable sheave chamber,
a variable displacement pump connected to supply fluid under pressure to said main line,
a control line,
means, including a modulator valve coupled to said main line, for establishing a fluid pressure in said control line which is substantially constant and approximately equal to the lowest pressure in said main line,
means, including a pump displacement control assembly coupled between said control line and said variable displacement pump, for regulating the pressure in said main line,
a transducer, coupled to said main line, for providing an electrical signal which varies as a function of the pressure in said main line, said pump displacement control assembly comprising a fluid control valve for providing a regulating signal to said variable displacement pump,
means, including a solenoid valve coupled between said fluid control valve and said transducer, for regulating operation of the variable displacement pump as a function of the signal provided by the transducer, and
a ratio control assembly, coupled between said main line and the primary pulley movable sheave chamber, for controlling the flow of fluid into and out of the primary pulley movable sheave chamber to regulate the ratio of the continuously variable transmission, and further comprising a cooling cutoff valve, coupled between said main line and said starting clutch, for providing a flow of cooling oil to the starting clutch when the cooling cutoff valve is in the appropriate position.

15. A control system as claimed in claim 14, and further comprising a fluid connection between said starting clutch chamber and the cooling cutoff valve, to ensure that flow of cooling oil to the starting clutch is not commenced until the starting clutch is applied.

16. A control system as claimed in claim 15, and further comprising a fluid connection between the primary pulley movable sheave chamber and the cooling cutoff valve, to ensure that flow of cooling oil to the clutch is terminated after the starting clutch is no longer slipping.

17. A hydraulic control system for a vehicle having a drivetrain including a continuously variable transmission and a starting clutch coupled in series for completing a power flow path to drive the vehicle, in which the continuously variable transmission has a primary pulley and a secondary pulley, each pulley including an axially fixed sheave and an axially displaceable sheave for varying the effective pulley diameter, a belt intercoupling the pulleys, a servo chamber in the primary pulley movable sheave for admitting and discharging fluid to control the transmission ratio, a servo chamber in the secondary pulley movable sheave for admitting and discharging fluid to maintain tension in the belt as the transmission is driven, a servo chamber in the starting clutch for admitting and discharging fluid to complete and interrupt the drive train, and a main line connected to the secondary sheave servo chamber to supply fluid at a variable pressure to this chamber, characterized by a pump connected to supply fluid under pressure to said main line, a low pressure control line, a pressure modulator valve coupled between said main line and said low pressure control line for establishing in said control line a fluid pressure which is approximately equal to the lowest pressure in said main line and is regulated to be substantially constant, and means, including a pump control assembly coupled between said low pressure control line and said pump, for regulating the pressure in said main line.

18. A hydraulic control system for a vehicle having a drive train including a continuously variable transmission and a starting clutch coupled in series for completing a power flow path to drive the vehicle, in which the continously variable transmission has a primary pulley and a secondary pulley, each pulley including an axially fixed sheave and an axialy displaceable sheave for varying the effective pulley diameter, a belt intercoupling the pulleys, a servo chamber in the primary pulley movable sheave for admitting and discharging fluid to control the transmission ratio, a servo chamber in the secondary pulley movable sheave for admitting and discharging fluid to maintain tension in the belt as the transmission is driven, a servo chamber in the starting clutch for admitting and discharging fluid to complete and interrupt the drive train, and a main line connected to the secondary sheave servo chamber to supply fluid at a variable pressure to this chamber, characterized by a variable displacement pump connected to supply fluid under pressure to said main line, a low pressure control line, a pressure modulator valve coupled between said main line and said low pressure control line for establishing in said control line a fluid pressure which is approximately equal to the lowest pressure in said main line and is regulated to be substantially constant, means, including a pump displacement control assembly coupled between said low pressure control line and said variable displacement pump, for regulating the variable pressure in said main line, and further comprising means for cooling the starting clutch, including a cooling cut-off valve having an input connection coupled to said main line, an output connection for passing cooling fluid to the clutch, a first control connection coupled to the clutch servo chamber for effecting cooling of the clutch when the vehicle is started, and a second control connection, coupled to the primary pulley servo chamber, for terminating cooling of the clutch after the clutch is no longer slipping.

19. A control system for a continuously variable transmission having a primary pulley and a secondary pulley., each pulley having a pair of sheaves and an effective diameter adjustable as a function of axial displacement of one of said sheaves relative to the other of said sheaves, a belt intercoupling the pulleys, a fluid chamber in the primary pulley for admitting and discharging fluid to change the effective pulley diameter and correspondingly change the transmission ratio, a fluid chamber in the secondary pulley for admitting and discharging fluid to maintain tension in the belt as the transmission is driven, and a main line connected to supply fluid under pressure to a secondary pulley fluid chamber, a pump connected to supply fluid under pressure to said main line, a control line, means including a modulator valve for establishing in said control line a fluid pressure which is regulated to be substantially constant, and means, including a pump control assembly coupled between said control line and said pump, for regulating the pressure in said main line.

* * * * *